(12) United States Patent
Huang et al.

(10) Patent No.: US 7,796,210 B2
(45) Date of Patent: Sep. 14, 2010

(54) BACKLIGHT WITH COMPLEX DIFFUSERS AND FLAT PANEL DISPLAY USING THE SAME

(75) Inventors: Chi-Jen Huang, Taichung (TW); Chih-Li Chang, Tainan (TW)

(73) Assignee: Hannstar Display Corporation, Taipei County (TW)

( * ) Notice: Subject to any disclaimer, the term of this patent is extended or adjusted under 35 U.S.C. 154(b) by 1289 days.

(21) Appl. No.: 11/306,632

(22) Filed: Jan. 5, 2006

(65) Prior Publication Data
US 2006/0197888 A1    Sep. 7, 2006

Related U.S. Application Data

(63) Continuation-in-part of application No. 10/905,766, filed on Jan. 20, 2005, now Pat. No. 7,440,045.

(30) Foreign Application Priority Data

Jun. 11, 2004 (TW) ............................. 93116793 A

(51) Int. Cl.
*G02F 1/1335* (2006.01)

(52) U.S. Cl. ........................................................ 349/64
(58) Field of Classification Search ................... 349/64
See application file for complete search history.

(56) References Cited

U.S. PATENT DOCUMENTS

| 7,397,522 B2* | 7/2008 | Lee et al. ...................... 349/65 |
| 2004/0032725 A1* | 2/2004 | Hsieh et al. ................... 362/31 |
| 2004/0114065 A1* | 6/2004 | Yu et al. ........................ 349/61 |
| 2009/0046217 A1* | 2/2009 | Fukayama .................... 349/58 |

* cited by examiner

*Primary Examiner*—David Nelms
*Assistant Examiner*—Nathanael R Briggs
(74) *Attorney, Agent, or Firm*—Jianq Chyun IP Office

(57) ABSTRACT

A flat panel display includes a backlight module, a liquid crystal display panel, and a complex diffuser plate. The liquid crystal display panel is disposed on the backlight module, and the complex diffuser plate including a first and a second diffusion layers is disposed between the backlight module and the liquid crystal display panel. Furthermore, the first diffusion layer is adjacent to the liquid crystal display panel and the second diffusion layer is adjacent to the first diffusion layer. The first and the second diffusion layers have different refractive indexes, transmittances and haze values, so that optical performance of the flat panel display is improved.

18 Claims, 4 Drawing Sheets

BACKLIGHT WITH COMPLEX DIFFUSERS AND FLAT PANEL DISPLAY USING THE SAME

CROSS-REFERENCE TO RELATED APPLICATION

This application is a continuation-in-part application of the U.S. application Ser. No. 10/905,766, filed on Jan. 20, 2005, which claims the priority benefit of Taiwan application serial no. 93116793, filed on Jun. 11, 2004. All disclosures are incorporated herewith by reference.

BACKGROUND OF THE INVENTION

1. Field of the Invention

The present invention generally relates to a flat panel display, more particularly to a flat panel display with a uniformly enhanced brightness and free of lamp mura.

2. Description of Related Art

With the high technology developing, video products, especially digital video or imaging devices, have become more popular in our life. For these video products, displays are the vital components for delivering associated image or information. Users may read information via the displays or further control the operation of the devices by the displays.

Most noticeable displays, such as direct backlight Liquid Crystal Displays (LCD), are developed by the combination of the optoelectronic technology and the semiconductor technology. Since the direct backlight LCDs have several advantage features such as low voltage operation, radiation free, light weight and compact in size, they recently become a main research subject, especially for the large size LCD TV.

FIG. 1 is a cross sectional view of a conventional direct backlight LCD. Referring to FIG. 1, the direct backlight LCD consists of a direct backlight module 100 and a liquid crystal display panel 110 as the image medium. Besides, the direct backlight module 100 comprises a plurality of lamps 102, a brightness enhancement film 140, a first diffuser plate 130, and a second diffuser plate 120. Lamp mura is referred to the observation of the lamps 102 shape, for example, a multi-stripe pattern for cold cathode fluorescent lamps (CCFL), on the liquid crystal display panel 110, which in turn deteriorates the quality of the images. Therefore, to avoid the lamp mura appearance over the lamps 102, the second diffuser plate 120 for diffusing light emitting from the lamps 102 is usually disposed between the backlight module 100 and the display panel 110. Typically, the second diffuser plate 120 with a higher haze value and a lower total transmittance is selected. However, such the above configuration will result in reducing the brightness, which in turn additionally necessitates the brightness enhancement film 140 for enhancing brightness. Furthermore, the first diffuser plate 130 is required to be added on the second diffuser plate 120 to avoid directly observing the shape of the lamps 102 if the second diffuser plate 120 with higher transmittance is employed.

The conventional LCD backlight module 100 has several drawbacks, such as poor brightness, bulky volume, long assembling time and poorly free of lamp mura. Accordingly, to overcome the preceding problems, a novel LCD backlight module is needed to promote its competence in the display market.

SUMMARY OF THE INVENTION

The present invention is directed to a flat panel display with a uniformly enhanced brightness, free of lamp mura, and short assembling time.

The present invention is further directed to the flat panel display with a brightness enhancement diffuser plate for maintaining optical performance, reducing the number of optical films, maintaining image quality, and reducing cost of optical films at the same time.

Accordingly, the present invention provides a flat panel display which comprises a backlight module. A liquid crystal display panel is disposed on the backlight module, and a complex diffuser plate disposed between the backlight module and the liquid crystal display panel. In addition, the complex diffuser includes a first and a second diffuser layers combined to each other, which the first diffuser layer is adjacent to the liquid crystal display panel and the second diffuser layer is adjacent to the first diffuser layer. The first diffuser layer and the second diffuser layer have different refractive indexes, transmittances and haze values.

Accordingly, the invention further provides the flat panel display with a complex diffuser. The complex diffuser has at least the first and second diffuser layer. The second diffuser layer is separated from the first diffuser layer with a first air layer, and refractive indexes of the first diffuser layer and a second diffuser layer are larger than that of the first air layer.

Accordingly, the invention further provides the flat panel display with a complex diffuser. The first diffuser layer includes a first recess and a first protrusion and the second diffuser layer includes a second protrusion and a second recess. Furthermore, the first recess is embedded to the second protrusion and the second recess is embedded to the first protrusion, thereby forming an embedding interface between the first diffuser layer and the second diffuser layer.

Accordingly, the invention further provides the flat panel display with a complex diffuser. The first diffuser layer further comprises a first plate, which the first recess and the first protrusion are disposed on, and the second diffuser layer further comprises a second plate, which the second protrusion and the second recess are disposed on.

Accordingly, the invention further provides the flat panel display with a complex diffuser. The complex diffuser further comprises a third diffuser layer adjacent to the second diffuser layer, and a fourth diffuser layer adjacent to the third diffuser layer. The third diffuser plate and the fourth diffuser plate have different refractive indexes, transmittances and haze values.

Accordingly, the invention further provides the flat panel display with a complex diffuser. The fourth diffuser layer is separated from the third diffuser layer with a second air layer, and refractive indexes of the third diffuser layer and a fourth diffuser layer are larger than that of the second air layer.

Accordingly, the invention further provides the flat panel display with a complex diffuser. The third diffuser layer includes a third recess and a third protrusion, the fourth diffuser layer includes a fourth protrusion and a fourth recess, the third recess is embedded to the fourth protrusion and the fourth recess is embedded to the third protrusion, thereby forming an embedding interface between the third diffuser layer and the fourth diffuser layer.

Accordingly, the invention further provides the flat panel display, wherein the third diffuser layer further comprises a third plate, wherein the third recess and the third protrusion are disposed on the third plate, and the fourth diffuser layer further comprises a fourth plate, wherein the fourth protrusion and the fourth recess are disposed on the fourth plate.

Accordingly, the invention further provides the flat panel display, wherein the refractive index of the first diffuser layer is larger than that of the second diffuser layer.

Accordingly, the invention further provides the flat panel display, wherein the transmittance of the first diffuser layer is less than that of the second diffuser layer.

Accordingly, the invention further provides the flat panel display, wherein the haze value of the first diffuser layer is larger than that of the second diffuser layer.

Accordingly, the present invention provides a brightness enhancement diffuser plate, comprises a first diffuser layer, and a second diffuser layer combined to and adjacent to the first diffuser layer, as well as the first diffuser layer and the second diffuser layer have different refractive indexes, transmittances and haze values.

Accordingly, the present invention provides the brightness enhancement diffuser plate, which further comprises a third diffuser layer adjacent to the second diffuser layer, and a fourth diffuser layer adjacent to the third diffuser layer, wherein the third diffuser plate and the fourth diffuser plate have different refractive indexes, transmittances and haze values.

Accordingly, the present invention provides the brightness enhancement diffuser plate, wherein the material of the first diffuser layer and the third diffuser layer comprises Acrylic, Cyclo Olefin Copolymer, or Polycarbonate.

Accordingly, the present invention provides the brightness enhancement diffuser plate, wherein the material of the second diffuser layer and the fourth diffuser layer comprises Cyclo Olefin Copolymer, Polycarbonate, or Polyetherimide.

Accordingly, the present invention provides the brightness enhancement diffuser plate, wherein the second diffuser layer is separated from the first diffuser layer with a first air layer, and refractive indexes of the first diffuser layer and a second diffuser layer are larger than that of the first air layer.

Accordingly, the present invention provides the brightness enhancement diffuser plate, wherein the fourth diffuser layer is separated from the third diffuser layer with a second air layer, and refractive indexes of the third diffuser layer and a fourth diffuser layer are larger than that of the second air layer.

Accordingly, the present invention provides the brightness enhancement diffuser plate, wherein the material of the first diffuser layer comprises Cyclo Olefin Copolymer, Polycarbonate, or Polyetherimide.

Accordingly, the present invention provides the brightness enhancement diffuser plate, wherein the material of the second diffuser layer comprises Acrylic, Cyclo Olefin Copolymer, or Polycarbonate.

Since the present invention adopts the brightness enhancement diffuser plate comprised of multiple diffuser layers having different optical characteristics, the flat panel display can attain optimal optical performance, maintain optical performance and image quality, as well as reduce assembling time by diffusing and then converging the light emitting from the backlight module.

The objectives, other features and advantages of the invention will become more apparent and easily understood from the following detailed description of the invention when taken in conjunction with the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
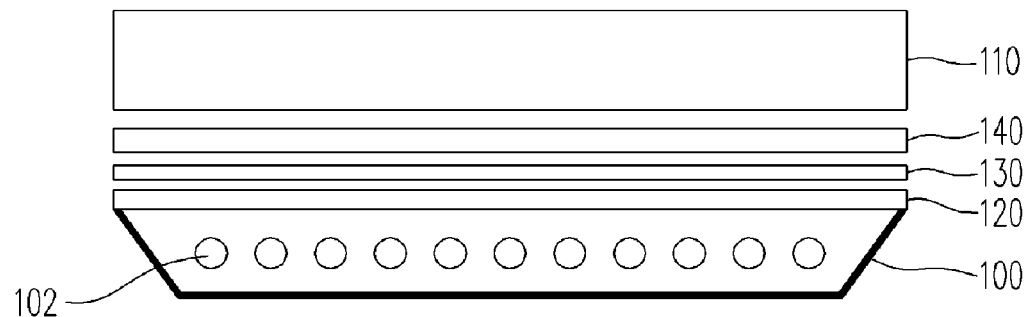
FIG. 1 is a cross sectional view of a conventional flat panel display.

Reference will now be made in detail to the present preferred embodiments of the invention, examples of which are illustrated in the accompanying drawings. Wherever possible, the same reference numbers are used in the drawings and the description to refer to the same or like parts.

The First Embodiment

Figure 2:
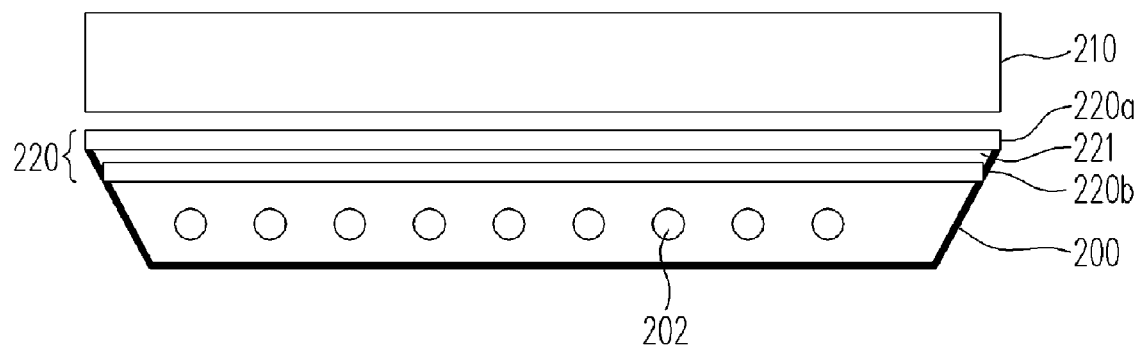
FIG. 2 is a cross sectional view of a flat panel display of one embodiment of the present invention, wherein the brightness enhancement diffuser plate comprises a first air layer.

FIG. 2 is a cross sectional view of a flat panel display of one embodiment of the present invention. Referring to FIG. 2, the flat panel display comprises a backlight module 200, a complex diffuser plate or a brightness enhancement diffuser plate (BEDP) 220 (including 220a and 220b) disposed on the backlight module 200 and an LCD panel 210, wherein the LCD panel 210, is disposed over the backlight module 200. Furthermore, the backlight module 200 comprises a light source 202, a reflector sheet (not shown) for masking the light source 202, and the complex diffuser plate 220 that comprises a first diffuser layer 220a and a second diffuser layer 220b separated from the first diffuser layer 220a with a first air layer 221. The first diffuser layer 220a and the second diffuser layer 220b are combined to each other, and the first diffuser layer 220a is adjacent to the liquid crystal display panel 210, the second diffuser layer 220b is adjacent to the first diffuser layer 220a. Moreover, the first diffuser layer 220a and the second diffuser layer 220b have different refractive indexes, transmittances and haze values.

In this embodiment, the light source may be, for example, a cold cathode fluorescent lamp (CCFL), a light emitting diode (LED), an external electrode fluorescent lamp (EEFL), an electro luminescent (EL) or a flat lamp plate.

The thickness of the first air layer 221 ranges from 3 mm to 12 mm. By appropriately choosing the refraction indexes and the transmittance of these two diffuser layers 220a and 220b, the thickness of the backlight module can be significantly reduced without sacrificing uniformly enhanced brightness and with totally free of lamp mura. The refractive indexes of the first diffuser layer 220a and the second diffuser layer 220b are larger than that of the first air layer. Alternatively, the first air layer 221 can be replaced by an evacuated air layer with the refractive index less than or equal to 1.

In this embodiment, the refractive index of the first diffuser layer 220a may larger than that of the second diffuser layer 220b. Preferably, a ratio of the refractive index of the first diffuser layer to that of the second diffuser layer is between 1.01 and 1.40, or the refractive index of the first diffuser layer is between 1.50 and 1.90, for example, the material of the first diffuser layer comprises Cyclo Olefin Copolymer (COC), Polycarbonate (PC), Polyetherimide (PEI) or the combination etc. and the refractive index of the second diffuser layer is between 1.40 and 1.60, for example, the material of the second diffuser layer comprises Acrylic (PMMA), Cyclo Olefin Copolymer (COC), or Polycarbonate (PC) or the combination etc.

In this embodiment, the transmittance of the first diffuser layer may less than that of the second diffuser layer. Preferably, a ratio of the transmittance of the first diffuser layer to that of the second diffuser layer is between 0.70 and 1.00, or the transmittance of the first diffuser layer is between 0.70 and 0.85 and the transmittance of the second diffuser layer is between 0.85 and 0.90.

In this embodiment, the haze value of the first diffuser layer may larger than that of the second diffuser layer. Preferably, a ratio of the haze value of the second diffuser layer to that of the first diffuser layer is between 0.80 and 1.00, or the haze value of the first diffuser layer is between 0.90 and 0.96 and the haze value of the second diffuser layer is between 0.86 and 0.90.

Therefore, the refractive index of the first diffuser layer 220a is larger than that of the second diffuser layer 220b, the transmittance of the first diffuser layer 220a is less than that of the second diffuser layer 220b, and the haze value of the first diffuser layer 220a is larger than that of the second diffuser layer 220b.

It can be concluded that the refractive indexes, the transmittances and the haze values of the first diffuser layer 220a and the second diffuser layer 220b can be coordinated in any way depending on the requirement of the product. In addition, individual components in the drawings are not drawn to scale, i.e. the total thickness of the complex diffuser plate 220 and individual thickness of the first diffuser layer 220a and the second diffuser layer 220b can be varied according to requirements of practical design, not limited to the scale shown in the drawings.

The Second Embodiment

Figure 3:
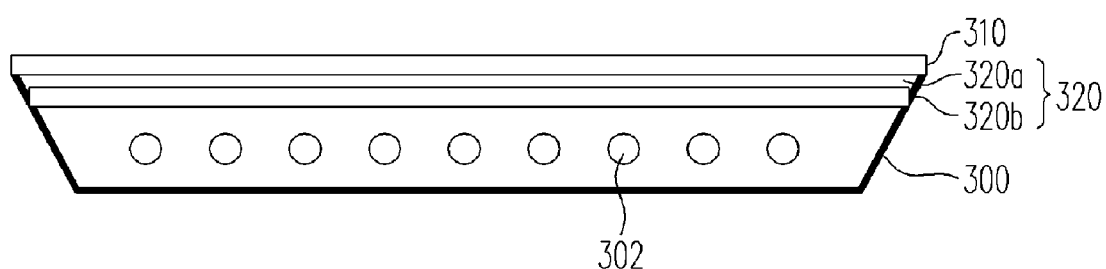
FIG. 3 is a cross sectional view of a flat panel display of another embodiment of the present invention, wherein the first diffuser layer and the second diffuser layer of the brightness enhancement diffuser plate are formed to have series of protrusions.

FIG. 3 is a cross sectional view of a flat panel display of another embodiment of the present invention. Referring to FIG. 3 the flat panel display comprises a backlight module 300, a complex diffuser plate 320 (including 320a and 320b) disposed on the backlight module 300 and an LCD panel 310, wherein the LCD panel 310, is disposed over the backlight module 300. Furthermore, the backlight module 300 comprises a light source 302, a reflector sheet (not shown) for masking the light source 302, and the complex diffuser plate 320 that comprises a first diffuser layer 320a and a second diffuser layer 320b. The first diffuser layer 320a and the second diffuser layer 320b are combined or embedded to each other, and the first diffuser layer 320a is adjacent to the liquid crystal display panel 310, the second diffuser layer 320b is adjacent to the first diffuser layer 320a. Moreover, the first diffuser layer 320a and the second diffuser layer 320b have different refractive indexes, transmittances and haze values.

The Third Embodiment

Figure 4:
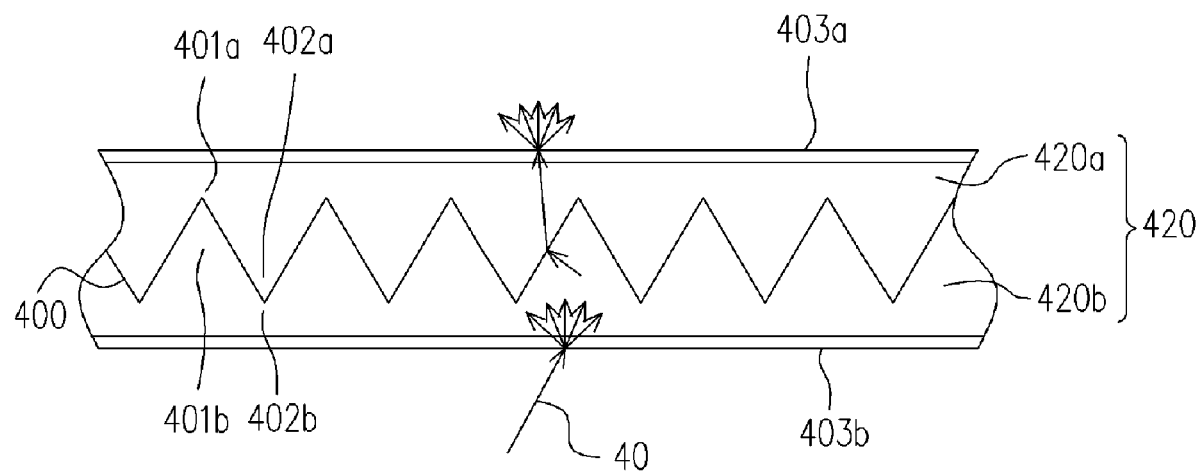
FIG. 4 is a cross sectional enlarged view of the brightness enhancement diffuser plate of the flat panel display in FIG. 3.

FIG. 4 is a cross sectional enlarged view of the complex diffuser plate 320 of a flat panel display in FIG. 3, and the complex diffuser plate is renumbered as 420 for according to FIG. 4. The complex diffuser plate 420 comprises a first diffuser layer 420a and a second diffuser layer 420b. The first diffuser layer 420a includes a first recess 401a and a first protrusion 402a and the second diffuser layer 420b includes a second recess 402b and a second protrusion 401b, wherein the first recess 401a and the second protrusion 401b are embedded to each other, and the second recess 402b and the first protrusion 402a are embedded to each other as well. The embedding interface 400 between the first diffuser layer 420a and the second diffuser layer 420b may be a prism interface as shown in FIG. 4, or a simple geometric surface, a wavy surface, a Fourier series curve surface, a fractal curve surface and one of other nonlinear adjacent to shape surfaces.

The so-called simple geometric surface includes either a variety of simple flat planes and tilted planes and the prism interface as shown in FIG. 4 may be regarded as the simple geometric surface consisted of simple tilted planes. The so-called wavy surface has a cross sectional curve line, which can be described with a sinusoidal or a cosinusoidal function. The Fourier series curve surface has a cross sectional curve line, which can be described by Fourier series. The fractal curve surface has a cross sectional curve line that includes fractional dimension that has a self-imitating feature; in other words, in a gradually contracting scale, the details will be replicated in a certain type of contracting manner, which results in a complicated curve surface with a certain type of reiteration. Other nonlinear adjacent to shape surfaces are curve surfaces other than various curve surfaces described above and cannot be described by mathematical models.

Furthermore, in order to enhance the function of the complex diffuser plate of the invention, the first diffuser layer 420a may proceed with a matte process, thereby forming an auxiliary diffuser layer 403a over the emitting surface of the first diffuser layer 420a to enhance a diffusing effect. A transparent conductive film 403b made of indium tin oxide (ITO) or other transparent conductive material is disposed on an incident surface of the second diffuser layer 420b to serve as electrical ground, thereby also enhancing the diffusion effect.

Accordingly, when the light 40 from the back light module 300 (as shown in FIG. 3) is incident on the embedding interface 400 via the second diffuser layer 420b, the incident light refracts via the embedding interface 400 such that light 40 is deviated in the direction of the complex diffuser plate to attain the light converging effect.

The Fourth Embodiment

Figure 5:
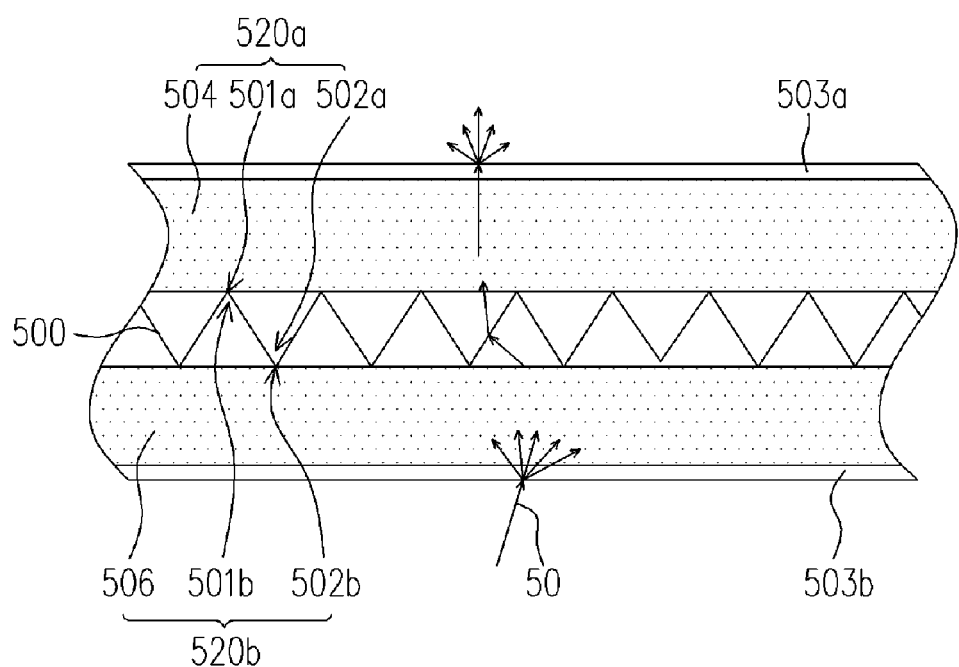
FIG. 5 is another cross sectional enlarged view of the brightness enhancement diffuser plate of the flat panel display in FIG. 3.

FIG. 5 is another cross sectional enlarged view of the complex diffuser plate of a flat panel display in FIG. 3. The complex diffuser plate comprises a first diffuser layer 520a and a second diffuser layer 520b. The first diffuser layer 520a includes a first plate 504, a first recess 501a, and a first protrusion 502a, and the second diffuser layer 520b includes a second plate 506, a second recess 502b and a second protrusion 501b, wherein the first recess 501a and the second protrusion 501b are embedded to each other, and the second recess 502b and the first protrusion 502a are embedded to each other as well. The embedding interface 500 between the first diffuser layer 520a and the second diffuser layer 520b may be a prism interface as shown in FIG. 5, or others as mentioned in the third embodiment.

In this embodiment, the first recess 501a and the first protrusion 502a are disposed on the first plate 504, and the second protrusion 501b and the second recess 502b are disposed on the second plate 506. The first protrusion 502a and the first plate 504 have different transmittances and haze values, but refractive indexes can be similar. Furthermore, the second protrusion 501b and the second plate 506 have different transmittances and haze values, but refractive indexes can be similar too.

For example, when the first recess 501a and the first protrusion 502a of the complex diffuser plate are PC, the refractive index of PC is about 1.65, the refractive index of the first plate 504 can be chosen form 1.56 to 1.70, such as, PC or PEI; when the second protrusion 501b and the second recess 502b are Acrylic, the refractive index of Acrylic is about 1.49, the refractive index of the second plate 506 can be chosen from 1.40 to 1.55, such as, Acrylic or COC.

Furthermore, in order to enhance the function of the complex diffuser plate of the invention, the first diffuser layer 520a may proceed with a matte process, thereby forming an auxiliary diffuser layer 503a over the emitting surface of the first diffuser layer 520a to enhance a diffusing effect. A transparent conductive film 503b made of indium tin oxide (ITO) or other transparent conductive material is disposed on an incident surface of the second diffuser layer 520b to serve as electrical ground, thereby also enhancing the diffusion effect.

Accordingly, when the light 50 from the back light module 300 (as shown in FIG. 3) is incident on the embedding interface 500 via the second diffuser layer 520b, the incident light refracts via the embedding interface 500 such that light 50 is deviated in the direction of the complex diffuser plate to attain the light converging effect.

The Fifth Embodiment

In addition, the present invention further provides a complex diffuser plate of a flat panel display, which is based on the first embodiment in FIG. 2, further comprising a third diffuser layer adjacent to the second diffuser layer, and a fourth diffuser layer adjacent to the third diffuser layer, wherein the third diffuser plate and the fourth diffuser plate have different refractive indexes, transmittances and haze values.

The third diffuser layer and the fourth diffuser layer are separated from the third diffuser layer with a second air layer. The third diffuser layer and the fourth diffuser layer are combined to each other. The thickness of the second air layer ranges from 3 mm to 12 mm. By appropriately choosing the refraction indexes and the transmittance of these two diffuser layers, the thickness of the backlight module can be significantly reduced without sacrificing uniformly enhanced brightness and with totally free of lamp mura. The refractive indexes of the third diffuser layer and the fourth diffuser layer are larger than that of the first air layer. Alternatively, the second air layer can be replaced by an evacuated air layer with the refractive index less than or equal to 1.

The Sixth Embodiment

Figure 6A:
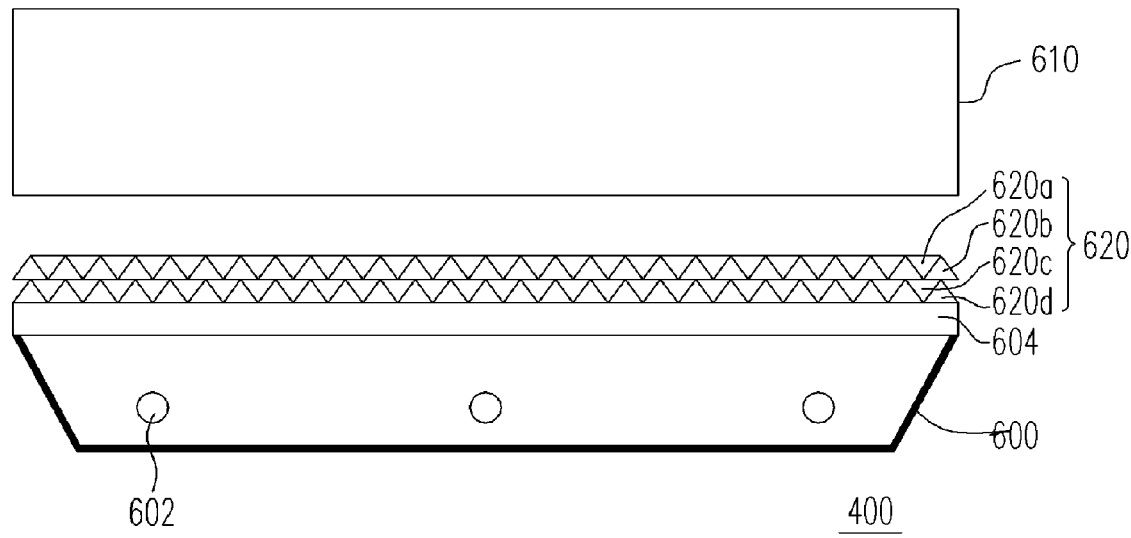
FIG. 6A is a cross sectional view of a flat panel display of another embodiment of the present invention, wherein the brightness enhancement diffuser plate comprises four diffuser layers having series of protrusions.

In addition, the present invention further provides a complex diffuser plate of a flat panel display, which is based on the second embodiment in FIG. 3 and the fifth embodiment. As shown in FIG. 6A, the flat panel display comprises a backlight module 600, an LCD panel 610 disposed on the backlight module 600, a complex diffuser plate 620 disposed between the backlight module 600 and the LCD panel 610, a light source 602 may be, for example, a CCFL, a LED, an EEFL, an EL or a flat lamp plate, a transparent substrate 604 is similar to the first plate 504 or the second plate 506 of the fourth embodiment in FIG. 5 for supporting a series of recesses and protrusions.

The complex diffuser plate 620 includes a first diffuser layer 620a, a second diffuser layer 620b embedded to the first diffuser layer 620a, a third diffuser layer 620c adjacent to the second diffuser layer 620b, a fourth diffuser layer 620d embedded to and adjacent to the third diffuser layer 620c. The fourth diffuser layer 620d, the third diffuser layer 620c, the second diffuser layer 620b (620b'), and the first diffuser layer 620a (620a') are disposed on the transparent substrate 604 sequentially.

Figure 6B:
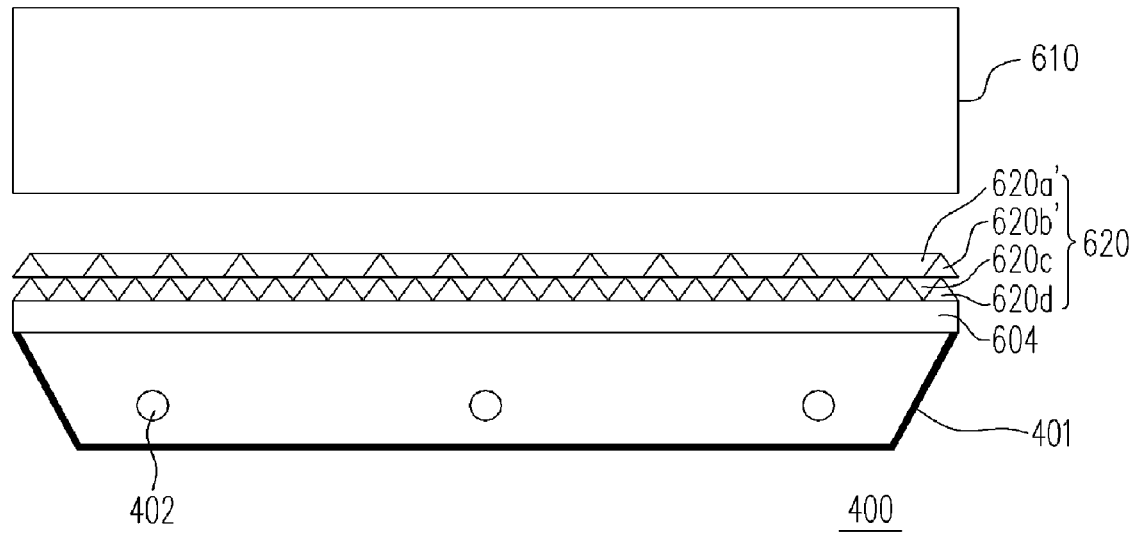
FIG. 6B is a cross sectional view of a flat panel display of another embodiment of the present invention, wherein the brightness enhancement diffuser plate comprises four diffuser layers having another series of protrusions.

As shown in FIG. 6A, the first diffuser layer 620a and the third layer 620c have shapes formed by series of inverted-triangles, and the second diffuser layer 620b and the fourth layer 620d have shapes formed by series of triangles, or as shown in FIG. 6B, this complex diffuser plate is identical to that shown in FIG. 6A except a first diffuser layer 620a' and a second diffuser layer 620b', wherein the second diffuser layer 620b' has a shape formed by a series of triangles but spaced by a constant distance with a pitch between the apexes of neighboring two triangles and the first diffuser layer 620a' has a shape formed by a series of trapezoids, as well as the second diffuser layer 620b' and the first diffuser layer 620a' are embedded each other.

The transmittance of the first diffuser layer 620a (620a') is less than or equal to that of the second diffuser layer 620b (620b'), the transmittance of the second diffuser layer 620b (620b') is less than or equal to that of the third diffuser layer 620c, and the transmittance of the third diffuser layer 620c is less than or equal to that of the fourth diffuser layer 620d. For example, the transmittances of first diffuser layer 620a (620a'), the second diffuser layer 620b (620b'), the third diffuser layer 620c and the fourth diffuser layer 620d are chosen from 0.81-0.84, 0.86-0.89, 0.91-0.94, and 0.95-0.99 respectively.

The haze value of the first diffuser layer 620a (620a') is larger than or equal to that of the second diffuser layer 620b (620b'), the haze value of the second diffuser layer 620b (620b') is larger than or equal to that of the third diffuser layer 620c, and the haze value of the third diffuser layer 620c is larger than or equal to that of the fourth diffuser layer 620d. For example, the haze values of first diffuser layer 620a (620a'), the second diffuser layer 620b (620b'), the third diffuser layer 620c and the fourth diffuser layer 620d are chosen from 0.15-0.20, 0.11-0.14, 0.06-0.10, and 0.01-0.05 respectively.

The refractive indexes of the first diffuser layer 620a (620a') and the third diffuser layer 620c ranges between 1.40-1.60, and the material of the first diffuser layer 620a (620a') and the third diffuser layer 620c may comprises Acrylic, COC, PC or the combination. The refractive indexes of the second diffuser layer 620b (620b') and the fourth diffuser layer 620d ranges between 1.50-1.90, the material of the second diffuser layer 620b (620b') and the fourth diffuser layer 620d comprises COC, PC, or PEI. Compare to the embodiments mentioned above, the limitation of the refractive indexes in this embodiment has more flexible than the embodiments having two diffuser layers.

Figure 7:
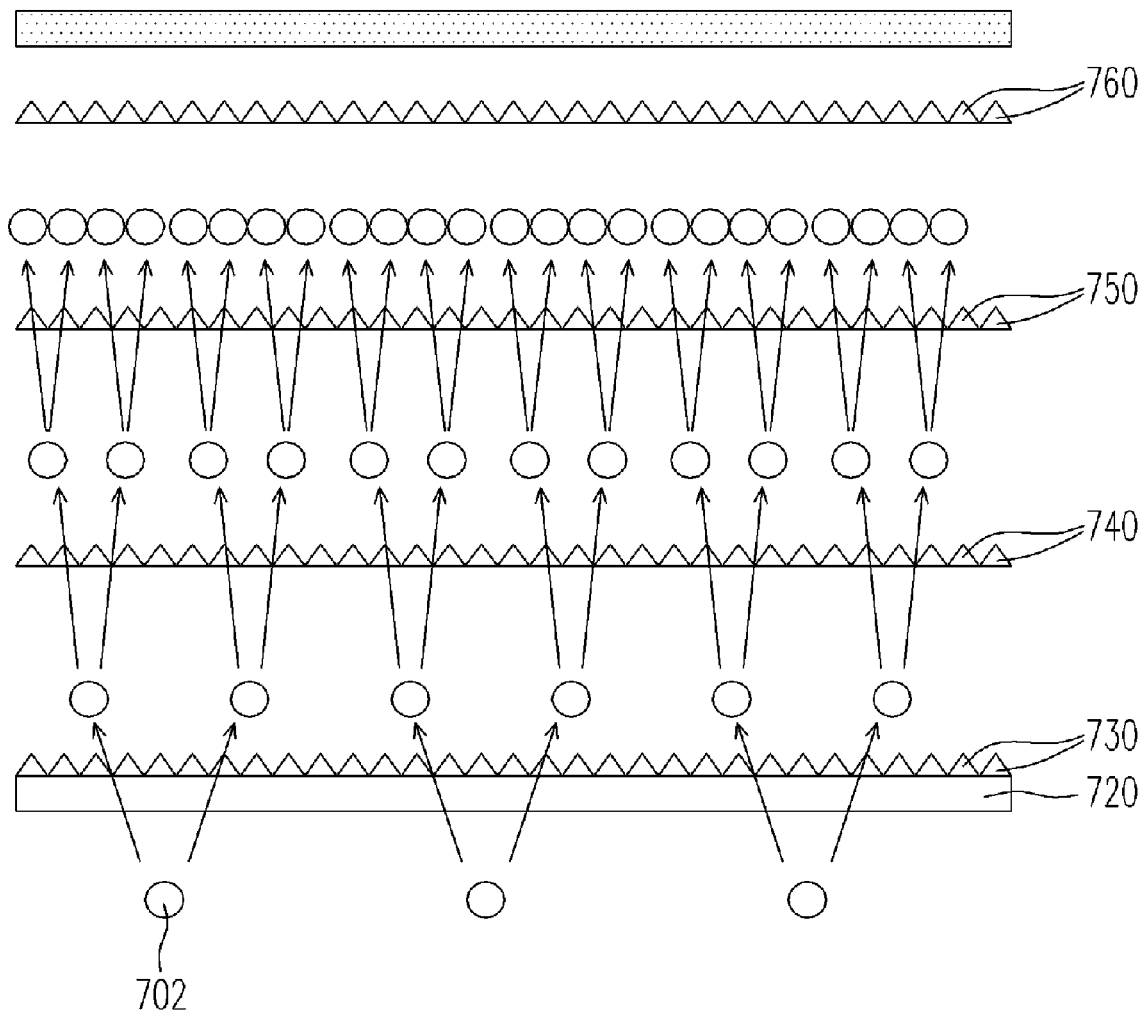
FIG. 7 is a cross sectional view of a flat panel display of another embodiment of the present invention illustrates the function manner of uniformly enhanced brightness and free of lamp mura.

FIG. 7 is a model that shows how the lamp mura is eliminated after the light (shown as arrows in FIG. 7) coming from the lamps 702 passes through a four-layer-prism-refraction diffuser plate. As shown in FIG. 7, three lamps 702 are provided as light sources. At the absence of the four diffuser layers 730, 740, 750 and 760, a three-striped pattern as a result of the shape of the three lamps 702 appears on the flat panel display after powered on, which is so called "lamp mura" that affects displaying quality. Evidently, there occurs a six-striped pattern after the light emitting from the three lamps 702 passes through the transparent substrate 720 and the fourth diffuser layer 730. Subsequently, there occurs a twelve-striped pattern after the six-striped pattern passes through the third diffuser layer 640. In other words, every diffuser layer is capable of duplicating the number of incident images so as to render the number of the light source images to be more uniformly distributed after they are refracted once. Then, there occurs a resultant 24-striped pattern after the twelve-striped pattern passes through the third diffuser layer 750. Eventually, no strip pattern can be found, shown as a uniformly distributed dot pattern, after the resultant 24-striped pattern passes through the fourth diffuser plate 760, which means the lamp mura is eliminated.

To summarize, compared with the prior art, the flat display panel of the present invention has the following advantages:

First, the present invention is able to allow the flat display panel to achieve several purposes of reducing assembling time and thereby lowering the fabricating cost because a backlight module comprised in the flat panel display of the present invention has a simplified structure.

Secondly, the present invention is able to allow the flat display panel to achieve the enhancement of the brightness and the elimination of the lamp mura, thereby promoting image quality without reducing the brightness of the flat display panel.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A flat panel display, comprising:
    a backlight module;
    a liquid crystal display panel disposed on the backlight module; and
    a complex diffuser plate disposed between the backlight module and the liquid crystal display panel, including a first, a second, a third and a fourth diffuser layers, wherein the first diffuser layer is adjacent to the liquid crystal display panel, the second diffuser layer is adjacent to the first diffuser layer, the third diffuser layer is adjacent to the second diffuser layer, the fourth diffuser layer is adjacent to the third diffuser layer and positioned between the third diffuser layer and the backlight module, as well as the first, the second, the third and the fourth diffuser layers have different refractive indexes, transmittances and haze values, and wherein the first diffuser layer includes a first recess and a first protrusion, the second diffuser layer includes a second protrusion and a second recess, the first recess is embedded to the second protrusion and the second recess is embedded to the first protrusion, thereby forming an embedding interface between the first diffuser layer and the second diffuser layer.

2. The flat panel display according to claim 1, wherein the second diffuser layer is separated from the first diffuser layer with a first air layer, and refractive indexes of the first diffuser layer and the second diffuser layer are larger than that of the first air layer.

3. The flat panel display according to claim 2, wherein the first air layer is evacuated to be an evacuated air layer with its refractive index less than or equal to 1.

4. The flat panel display according to claim 2, wherein the thickness of the first air layer ranges from 3 mm to 12 mm.

5. The flat panel display according to claim 1, wherein the first diffuser layer further comprises a first plate, wherein the first recess and the first protrusion are disposed on the first plate, and the second diffuser layer further comprises a second plate, wherein the second protrusion and the second recess are disposed on the second plate.

6. The flat panel display according to claim 1, wherein the complex diffuser plate further comprises an auxiliary diffuser layer adjacent to the liquid crystal display panel.

7. The flat panel display according to claim 1, wherein the complex diffuser plate further comprises a transparent conductive film adjacent to the backlight module.

8. The flat panel display according to claim 1, wherein the fourth diffuser layer is separated from the third diffuser layer with a second air layer, and refractive indexes of the third diffuser layer and the fourth diffuser layer are larger than that of the second air layer.

9. The flat panel display according to claim 8, wherein the second air layer is evacuated to be an evacuated air layer with its refractive index less than or equal to 1.

10. The flat panel display according to claim 8, wherein the thickness of the second air layer ranges from 3 mm to 12 mm.

11. The flat panel display according to claim 1, wherein the third diffuser layer comprises a third recess and a third protrusion, the fourth diffuser layer comprises a fourth protrusion and a fourth recess, the third recess is embedded to the fourth protrusion and the fourth recess is embedded to the third protrusion, thereby forming an embedding interface between the third diffuser layer and the fourth diffuser layer.

12. The flat panel display according to claim 11, wherein the third diffuser layer further comprises a third plate, wherein the third recess and the third protrusion are disposed on the third plate, and the fourth diffuser layer further comprises a fourth plate, wherein the fourth protrusion and the fourth recess are disposed on the fourth plate.

13. The flat panel display according to claim 1, wherein the refractive index of the first diffuser layer is larger than that of the second diffuser layer.

14. The flat panel display according to claim 1, wherein a ratio of the refractive index of the first diffuser layer to that of the second diffuser layer is between 1.01 and 1.40.

15. The flat panel display according to claim 1, wherein the transmittance of the first diffuser layer is less than that of the second diffuser layer.

16. The flat panel display according to claim 1, wherein a ratio of the transmittance of the first diffuser layer to that of the second diffuser layer is between 0.70 and 1.00.

17. The flat panel display according to claim 1, wherein the haze value of the first diffuser layer is larger than that of the second diffuser layer.

18. The flat panel display according to claim 1, wherein a ratio of the haze value of the second diffuser layer to that of the first diffuser layer is between 0.80 and 1.00.

* * * * *